United States Patent [19]
Koch

[11] Patent Number: 5,897,485
[45] Date of Patent: Apr. 27, 1999

[54] INCUBATOR FOR INFANTS

[75] Inventor: Jochim Koch, Ratzeburg, Germany

[73] Assignee: Drägerwerk AG, Lübeck, Germany

[21] Appl. No.: 08/932,841

[22] Filed: Sep. 18, 1997

[30] Foreign Application Priority Data

Jun. 17, 1997 [DE] Germany .......................... 197 25 498

[51] Int. Cl.⁶ .................................................. A61G 11/00
[52] U.S. Cl. ............................................................. 600/22
[58] Field of Search .............................. 600/21, 22, 549

[56] References Cited

U.S. PATENT DOCUMENTS

| | | | |
|---|---|---|---|
| 4,034,740 | 7/1977 | Atherton et al. | 600/22 |
| 5,316,542 | 5/1994 | Koch et al. | 600/22 |
| 5,385,529 | 1/1995 | Koch | 600/22 |

FOREIGN PATENT DOCUMENTS

| | | |
|---|---|---|
| 36 07 575 A1 | 9/1987 | Germany . |
| 196 21 541 C1 | 4/1997 | Germany . |

*Primary Examiner*—Samuel Gilbert
*Attorney, Agent, or Firm*—McGlew and Tuttle, P.C.

[57] ABSTRACT

An incubator with a first air heater and a first fan is improved in terms of constant air temperature and air humidity in the interior space even after a brief opening of a flap. A second air heater and an associated second fan are additionally provided, whose operation is controlled via a measuring and control unit either as a function of a drop in the air temperature in the interior space of the incubator, which is measured by means of a temperature sensor or as a function of the open status of the flap (as sensed by a switch). An air humidifier module with heater, which is alternatively or additionally integrated in the arrangement, is optionally provided.

20 Claims, 1 Drawing Sheet

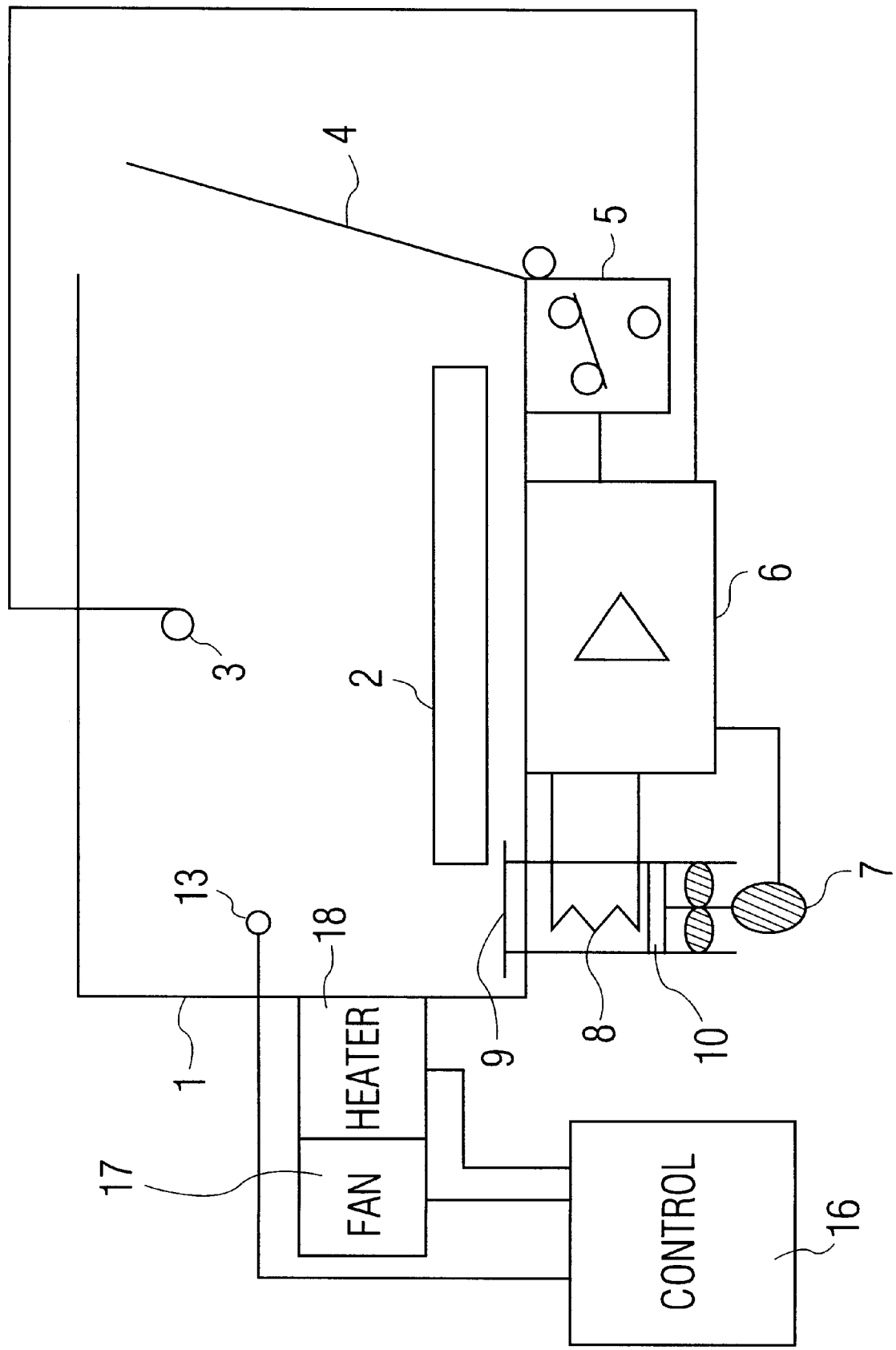

INCUBATOR FOR INFANTS

FIELD OF THE INVENTION

The present invention pertains to an incubator for infants with an air heater and a fan.

BACKGROUND OF THE INVENTION

An incubator of this type is described in DE 36 07 575 A1, whose design facilitates the special air guidance to maintain a stable incubator air temperature even with the hood partially opened in the form of a stable warm air curtain. During operation, the air of the interior space is fed to a fan and from there via an air heater.

An air humidifier of a modular design, which is able to release air drawn in from the environment by means of a fan in the conditioned state into the care area of newborn infants is disclosed in the patent specification DE 196 21 541 C1.

Incubators for the clinical practice have hitherto been designed mainly with the aim of ensuring the most uniform temperature possible in the closed state and to keep immature and sick premature and newborn infants sufficiently warm. It has recently been found that the patients have become increasingly premature and smaller and therapy with good chances of survival with adequate quality of life is possible by the use of corresponding medical engineering means. However, the intensive care medicine necessary for this has also led to the manipulation on the patient becoming increasingly intensive, with correspondingly frequent opening of the access openings provided at the incubator, especially in the form of flaps. Even though the incubators are designed to air condition the air of the interior space, both the temperature and the humidity decrease more or less intensely when passage openings or front flaps are opened. This abrupt decrease cannot be compensated rapidly enough with the prior-art incubators simply by control engineering measures, such as a corresponding heating and humidification, so that the patient does, in fact, suffer an increased loss of heat and his body temperature will correspondingly drop.

SUMMARY AND OBJECTS OF THE INVENTION

The object of the present invention is to improve an incubator for infants such that extensive constancy of the climate is achieved in the interior of the incubator with a few prior-art functional elements even after the opening of the hood of the incubator or of flaps present therein.

According to the invention, an incubator is provided for infants with an air heater and a fan. Additionally, to compensate the temperature drop occurring in the incubator as a consequence of the opening of the hood of the incubator, a second air heater and an associated second fan are present. The operation of this additional fan and heater are controlled via a measuring and control unit as a function of a drop in the air temperature in the incubator. A temperature sensor measures this drop in air temperature.

One essential advantage of the present invention is that a compact, very rapidly active possibility is provided by the combination of prior-art, readily available components for extensively accomplishing the desired object of a constant air conditioning in the interior space of the incubator when an abrupt temperature drop and loss of humidity of the air of the interior space is brought about via the incubator hood or its opened flaps.

The essence of the present invention is to ensure the compensation of the loss of warm air by means of an additional warm and preferably humidified flow of fresh air during the time during which the hood or a part of the incubator is opened. The additional air flow is switched on at the time of the opening of a flap, and this additional air flow generates a constant air conditioning by means of a fan and an air heater and preferably a downstream air humidifier. Measurements at usual incubators have shown that the short-term loss of warm air from the incubator, which frequently happens in practice, requires an additional, short-term thermal output, which cannot be made available by the existing incubator heater. The dead times and control response times are in the range of about a few minutes to 10 minutes, with correspondingly unfavorable consequences for the sensitive and sick patients, namely, losses of heat and humidity. Another advantage of the solution according to the present invention arises for the normal temperature control and optionally humidity control of the incubator. The temperature control controlling the main heater, according to which the temperature of the interior space is detected with a sensor, compared with a specified set point, and the heater is controlled correspondingly, is not needed during the time during which the hood or flap is open, and it remains at its control characteristic. It may even be fixed at the previous output for the duration of the opening. The temperature variations that may sill occur after the opening can be compensated directly with an additional temperature controller of the second additional air heater. When the flap is closed, there will be no more temperature overshoots, because the sluggish main air heater has not adjusted itself to an essentially higher thermal output, and the correspondingly large heat capacities in the incubator have not been heated up. In an alternative embodiment of the present invention, a heated additional air humidifier is provided in the connection space between the environment and the interior space of the incubator. This is accomplished in terms of design by an air humidifier module, which is preferably designed as a hollow fiber module and is kept ready in the waiting position preheated to a temperature of about 40° C. to a maximum of 45° C. As long as no additional air flow flows through the hollow fibers, no heat is released to the incubator. A solenoid valve or a nonreturn valve is opened by the actuated additional fan at the time of the opening of a flap of the incubator, so that the air can flow through and out of the air humidifier module into the incubator. The hollow fiber module immediately delivers warm and humidified air with a temperature of about 40° C. and 100% relative humidity. With a correspondingly rapid control of the water heater of the humidifier module, these values will also remain constant over longer periods of time. In terms of design, the air volume flow is dimensioned especially such that it corresponds to the heat loss of the incubator with the flap opened. The basic principle of the present invention is characterized by a second, additional fan, which delivers warm air into the incubator via a second air heater. As soon as a switch detects that part of the hood, especially a flap, is opened, a measuring and control unit switches on the additional fan and the second air heater. The air temperature in the incubator is measured by means of a temperature sensor. The additional fan with the additional air heater assumes the temperature control in the incubator during the time during which the flap is open. When the set point of the air temperature is exceeded, the additional fan with the additional air heater is timed with a longer break-make ratio. After closing the flap, the additional unit is again switched off. The usual temperature controller of the incubator will again assume the temperature control of the interior space proper. To prevent the normal air heater from cooling out or from continuing to operate at full output during the time the flap is open and to prevent it from cooling or overheating (undershooting or overshooting) after the closing of the flap, the normal incubator heater continues to be operated during the time the flap is open with exactly the same thermal output that was needed shortly before the opening of the flap in order to maintain the desired steady-state operating conditions. The normal temperature control of the incubator is bridged over during this period. Integral components are thus also unable to build up due to possible deviations from the set point if proportional-integral controllers are used.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a schematic representation of the device according to the invention.

DESCRIPTION OF THE PREFERRED EMBODIMENT

Referring to the drawings in particular, the invention is shown schematically in the FIGURE. The invention comprises a device for maintaining constant air temperature in an incubator. A basic temperature control system which is present in incubators is provided. Such a system with the corresponding components is not shown in detail. The incubator is operated with a basic air heater of the basic system during the normal operation. The thermal output of the system is controlled with fan 17 and heater 18 with the control 16 corresponding to the variance between the set point and the actual air temperature as sensed by a sensor 13 (this may be a different sensor from the sensor 3 described below or they may be the same single sensor).

The FIGURE shows a section through an incubator 1, which has in the front area a flap 4, which is briefly opened for the treatment or care of the patient. The lying surface 2 for the patient is likewise shown schematically only. By opening the flap 4, a switch 5 is actuated, which switches on both the additional fan 7 and the additional air heater 8 via the measuring and control unit 6. The additional air heater takes over the temperature control in the incubator 1 during the time the flap 4 is open. The nonreturn valve 9 opens as soon as the additional fan 7 is put into operation. The fan 7 and the air heater 8 belonging to it are located in the preferably tubularly designed connection space between the environment and the interior space of the incubator 1. The air temperature in the interior space of the incubator 1 is detected by means of the temperature sensor 3 and is transmitted to the measuring and control unit 6, which controls the operation of the fan 7 and of the air heater 8 as a function of preset temperature set points. When the air temperature is exceeded, the additional heater is switched off. When the air temperature drops below the set point, the additional heater is timed with a longer break-make ratio. The additional unit is switched off again after the flap 4 is closed. The normal temperature controller of the incubator 1, not shown, will resume the temperature control of the interior space proper.

If the loss of air humidity accompanying the opening of the flap is to be compensated, humidity (moisture) also must be added in addition to the heated air fed in preferably directly from the environment. However, this would mean that it is necessary to compensate not only the loss of humidity that results from the loss of the warm air curtain at the periphery of the incubator 1, but also the loss of humidity of the entire amount of air that is fed in by the additional second fan 7 from the relatively dry environment. It was found that especially favorable conditions prevail in terms of energy when an especially quick-acting air humidifier is used, which does not necessarily require additional ambient air for its operation. This may preferably be embodied by means of a humidifier module as is described in DE 196 21 541 C1 (which is hereby incorporated by reference). This module is continuously maintained at an operating temperature of 40° C. to about 45° C. As soon as the flap 4 is opened, the downstream additional fan 7 with the air humidifier 10 following it downstream in the direction of flow is switched on. Instead of an additional fan 7, a valve would also be able to release a bypass via the air humidifier, so that the air volume flow is branched off from the main fan 17 of the incubator. By opening the flap 4, the thermal output of an electrically heated air humidifier 10 is adjusted to the highest output in about 10 to 12 sec in practice by means of a switch 5 detecting the opening via the measuring and control unit 6 until an increase in the temperature of the interior space is detected by the temperature sensor 3 of the incubator 1. The thermal output of the air humidifier is then reduced again by prolonging the pauses between the individual current pulses for the heater and controlled relative to the temperature set point. After closing the flap 4, the increased thermal output of the air humidifier is again reduced to the normal thermal output that is stationary for the closed incubator 1. The thermal output of the air humidifier is again associated by the measuring and control unit 6 with the humidity set point of the air in the interior space of the incubator, and the thermal output of the heater is associated with the set point of the air temperature in the interior space of the incubator 1.

The method of use of the device further includes operating the two systems independently. The basic system operates based on the temperature sensed by sensor 13 (or sensor 3, as a common sensor may be used). The heater 18 and fan 17 are controlled in a generally known manner. This control continues even during situations wherein the flap is opened. As another embodiment of the method, the control setting is maintained during flap open situations (the control does not vary the fan or heater during situations wherein the flap is opened). The control 6 is operated during flap open situations as described above.

While a specific embodiment of the invention has been shown and described in detail to illustrate the application of the principles of the invention, it will be understood that the invention may be embodied otherwise without departing from such principles.

What is claimed is:

1. An incubator for infants, comprising:

an incubator housing with an openable element;

a first air heater in communication with an interior of said incubator housing;

a first fan in communication with said first air heater;

a second air heater to compensate a temperature drop occurring in said incubator housing as a consequence of an opening of said openable element, said second air heater also being in communication with said interior of said incubator housing;

a second fan in communication with said second air heater;

a temperature sensor in said interior of said housing;

a measuring and control unit for controlling the operation of said second air heater and said second fan as a function of a drop in an air temperature of said interior of said incubator housing, said air temperature being measured by means of said temperature sensor.

2. The incubator in accordance with claim 1, further comprising:

an air humidifier is arranged following said second fan in a direction of air flow.

3. The incubator in accordance with claim 2, wherein said air humidifier is made of a hollow fiber bundle.

4. The incubator in accordance with claim 2, wherein said air humidifier is connected to said measuring and control unit and is controlled by setting a thermal output of said air humidifier.

5. The incubator in accordance with claim 1, further comprising a switch activated by the opening of the incubator openable element, said switch for switching on said second air heater and for switching on said second fan by an electric signal to said measuring and control unit, wherein the air temperature in said incubator housing is controlled via a measuring and control circuit comprising said temperature sensor, said measuring and control unit, said second fan, and said second air heater.

6. The incubator in accordance with claim 1, wherein said second air heater and said second fan are arranged in a connection space between an environment and an interior space of the incubator housing, and wherein a nonreturn valve opening only during the operation of the said second fan is arranged following said second air heater with said associated second fan in the direction of air flow.

7. An incubator for infants, comprising:

an incubator housing with an openable element;

a first air heater in communication with an interior of said incubator housing;

a first fan in communication with said first air heater;

a second air heater in communication with said interior of said housing to compensate the temperature drop occurring in said interior of said incubator housing as a consequence of the opening of said openable element, a second fan in communication with said second air heater;

a temperature sensor in said interior of said housing;

a switch activated by the opening of the incubator openable element, said switch for sending a switching signal indicating if said incubator openable element is open;

a measuring and control unit for controlling operation of said second air heater and said second fan, said controlling being one of a function of a drop in air temperature in said interior of said incubator housing, which is measured by means of said temperature sensor and a function of said switching signal.

8. The incubator in accordance with claim 7, further comprising:

an air humidifier is arranged following said second fan in the direction of air flow.

9. The incubator in accordance with claim 8, wherein said air humidifier is made of a hollow fiber bundle.

10. The incubator in accordance with claim 8, wherein said air humidifier is connected to said measuring and control unit and is controlled by setting a thermal output of said air humidifier.

11. The incubator in accordance with claim 7, wherein said second air heater and said second fan are arranged in a connection space between an environment and an interior space of the incubator housing, and wherein a nonreturn valve opening only during the operation of the said second fan is arranged following said second air heater with said associated second fan in the direction of air flow.

12. The incubator in accordance with claim 7, wherein said first heater and said first fan are controlled based on a temperature sensed by said temperature sensor.

13. The incubator in accordance with claim 7, further comprising an additional temperature sensor and control unit for controlling said first heater and said first fan based on a temperature sensed by said additional temperature sensor.

14. A method of controlling an incubator for infants, comprising the steps of:

providing an incubator housing with an openable element;

providing a first air heater in communication with an interior of said incubator housing;

providing a first fan in communication with said first air heater;

providing a second air heater to compensate for a temperature drop occurring in said interior of said incubator housing as a consequence of an opening of said openable element, providing a second fan associated with said second air heater;

providing at least one of a switch activated by the opening of the incubator openable element and a temperature sensor;

performing one of sensing air temperature in said incubator housing with said temperature sensor and sending a switching signal indicating whether said incubator openable element is open;

controlling operation of said second air heater and said second fan with a measuring and control unit as a function one of a drop in the air temperature in the incubator, which is measured by means of said temperature sensor and as a function of said switching signal.

15. The method in accordance with claim 14, further comprising:

providing an air humidifier arranged following said second fan in the direction of air flow.

16. The method in accordance with claim 15, wherein said air humidifier is made of a hollow fiber bundle.

17. The method in accordance with claim 15, wherein said air humidifier is connected to said measuring and control unit and is controlled by setting a thermal output of said air humidifier.

18. The method in accordance with claim 14, wherein said second air heater and said second fan are arranged in a connection space between an environment and an interior space of the incubator housing, and wherein a nonreturn valve opening only during the operation of the said second fan is arranged following said second air heater with said associated second fan in the direction of air flow.

19. The method in accordance with claim 14, further comprising:

controlling said heater and said fan based on a temperature sensed by said temperature sensor.

20. The method in accordance with claim 14, further comprising:

providing an additional temperature sensor;

controlling said heater and said fan based on a temperature sensed by said additional temperature sensor.

* * * * *